United States Patent
Okajima et al.

(10) Patent No.: US 12,084,742 B2
(45) Date of Patent: Sep. 10, 2024

(54) METHOD FOR RECOVERING VALUABLE METAL

(71) Applicant: JX NIPPON MINING & METALS CORPORATION, Tokyo (JP)

(72) Inventors: Nobuaki Okajima, Hitachi (JP); Kazunori Tajiri, Hitachi (JP); Hiromichi Kashimura, Hitachi (JP)

(73) Assignee: JX METALS CIRCULAR SOLUTIONS CO., LTD., Tokyo (JP)

( * ) Notice: Subject to any disclaimer, the term of this patent is extended or adjusted under 35 U.S.C. 154(b) by 694 days.

(21) Appl. No.: 17/418,471

(22) PCT Filed: Dec. 23, 2019

(86) PCT No.: PCT/JP2019/050409
§ 371 (c)(1),
(2) Date: Jun. 25, 2021

(87) PCT Pub. No.: WO2020/137995
PCT Pub. Date: Jul. 2, 2020

(65) Prior Publication Data
US 2022/0098702 A1 Mar. 31, 2022

(30) Foreign Application Priority Data
Dec. 27, 2018 (JP) ................ 2018-246249

(51) Int. Cl.
*C22B 3/00* (2006.01)
*C22B 7/00* (2006.01)
(Continued)

(52) U.S. Cl.
CPC .............. *C22B 23/04* (2013.01); *C22B 7/006* (2013.01); *C25C 1/08* (2013.01);
(Continued)

(58) Field of Classification Search
CPC ......... B09B 2101/16; B09B 3/80; B09B 5/00; C22B 1/005; C22B 23/04; C22B 23/043;
(Continued)

(56) References Cited

U.S. PATENT DOCUMENTS 6,835,228 B1  12/2004 Lin et al.
8,444,744 B2   5/2013 Narisako et al.
(Continued)

FOREIGN PATENT DOCUMENTS

CA  3 058 572 A1  10/2018
CA  3 076 688 A1   4/2019
(Continued)

OTHER PUBLICATIONS

International Preliminary Report on Patentability and English translation of the Written Opinion of the International Searching Authority (Forms PCT/IB/338, PCT/IB/373, and PCT/ISA/237) for International Application No. PCT/JP2019/050409, dated Jul. 8, 2021.
(Continued)

*Primary Examiner* — Jenny R Wu
(74) *Attorney, Agent, or Firm* — Birch, Stewart, Kolasch & Birch, LLP

(57) ABSTRACT

A method for recovering at least cobalt of valuable metals, cobalt and nickel, from an acidic solution obtained by subjecting waste containing positive electrode materials for lithium ion secondary batteries to a wet process, the acidic solution comprising cobalt ions, nickel ions and impurities, wherein the method includes: a first extraction step for Co recovery, the first extraction step being for extracting cobalt ions by solvent extraction from the acidic solution and stripping the cobalt ions; an electrolytic step for Co recovery, the electrolytic step being for providing electrolytic cobalt by electrolysis using a stripped solution obtained in the first extraction step for Co recovery as an electrolytic
(Continued)

solution; a dissolution step for Co recovery, the dissolution step being for dissolving the electrolytic cobalt in an acid; and a second extraction step for Co recovery, the second extraction step being for extracting cobalt ions by solvent extraction from a cobalt dissolved solution obtained in the dissolution step for Co recovery and stripping the cobalt ions.

8 Claims, 3 Drawing Sheets

(51) Int. Cl.
  *C25C 1/08*    (2006.01)
  *H01M 10/0525*  (2010.01)
  *H01M 10/54*   (2006.01)

(52) U.S. Cl.
  CPC ....... *H01M 10/0525* (2013.01); *H01M 10/54* (2013.01); *H01M 2220/30* (2013.01)

(58) Field of Classification Search
  CPC . C22B 23/0461; C22B 23/0484; C22B 26/12; C22B 3/30; C22B 3/324; C22B 3/326; C22B 3/3842; C22B 3/3844; C22B 3/3846; C22B 7/005; C22B 7/006; C25C 1/08; H01M 10/052; H01M 10/0525; H01M 10/54; H01M 2220/30; Y02P 10/20; Y02W 30/84
  USPC ..................... 205/568; 75/714, 734; 423/139
  See application file for complete search history.

(56) References Cited

U.S. PATENT DOCUMENTS

2011/0135547 A1   6/2011  Kobayashi et al.
2020/0044295 A1*  2/2020  Arakawa ................ C01G 45/02

FOREIGN PATENT DOCUMENTS

| EP | 3 202 929 A1 | | 8/2017 |
|---|---|---|---|
| JP | 2005-149889 A | | 6/2005 |
| JP | 2010-180439 A | | 8/2010 |
| JP | 5706457 B2 | | 4/2015 |
| JP | 2016-113672 A | | 6/2016 |
| JP | 2016-194105 A | | 11/2016 |
| JP | 2019-179699 A | | 10/2019 |
| KR | 10-2011-0062307 A | | 6/2011 |
| KR | 20110062307 A | * | 6/2011 |
| WO | 2018/181816 A1 | | 10/2018 |

OTHER PUBLICATIONS

International Search Report for PCT/JP2019/050409 mailed on Feb. 4, 2020.
Extended European Search Report for EP19901811.0, dated Aug. 25, 2022.
Canadian Office Action and Search Report for corresponding Canadian Application No. 3125088, dated Aug. 19, 2022.

* cited by examiner

METHOD FOR RECOVERING VALUABLE METAL

FIELD OF THE INVENTION

The disclosure relates to a method for recovering a valuable metal such as cobalt and nickel from an acidic solution which is obtained by subjecting waste containing positive electrode materials for lithium ion secondary batteries to a wet process, and which contains cobalt ions, nickel ions and impurities.

BACKGROUND OF THE INVENTION

In recent years, it has been widely studied for recovery of valuable metals such as cobalt and nickel from waste containing positive electrode materials for lithium ion batteries discarded for expired product life, manufacturing defects or other reasons by means of a wet process or the like, in terms of effective utilization of resources.

For example, in order to recover valuable metals from waste containing positive electrode materials for lithium ion batteries, battery powder and the like obtained through a roasting step and other steps is added to an acid to be leached, resulting in an acidic solution in which lithium, nickel, cobalt, manganese, iron, copper, aluminum and the like are dissolved.

Subsequently, iron, copper, aluminum and the like are sequentially or simultaneously removed from various metal elements dissolved in the acidic solution by solvent extraction or neutralization at a plurality of stages, and valuable metals such as nickel, cobalt, manganese and lithium are separated and concentrated by solvent extraction to obtain a solution in which each metal is dissolved. Nickel and cobalt are recovered from each solution by electrolysis or the like (see, for example, Patent Literatures 1 to 3).

CITATION LIST

Patent Literatures

[Patent Literature 1] Japanese Patent Application Publication No. 2010-180439 A
[Patent Literature 2] U.S. Patent Application Publication No. 2011/0135547 A1
[Patent Literature 3] Japanese Patent No. 5706457 B

SUMMARY OF THE INVENTION

Technical Problem

It would be desirable in terms of aiming at recycling society for efficiently reusing limited resources, because, if high-purity cobalt and nickel can be recovered in the form of a compound with a predetermined inorganic acid such as sulfate from the waste containing the positive electrode materials for the lithium ion secondary batteries in the recovery process as described above, those compounds can be used in the production of lithium-ion secondary batteries.

Here, the acidic solution obtained by dissolving the battery powder or the like in an acid and then performing a predetermined neutralization or solvent extraction may contain impurities such as sodium, aluminum, manganese and the like. Such impurities reduce the purity of the finally obtained compound of cobalt or nickel with the inorganic acid. Therefore, they are required to be removed as much as possible upon recovery of cobalt or nickel.

The disclosure proposes a method for recovering a valuable metal, which can effectively remove certain impurities.

Solution to Problem

A method for recovering a valuable metal disclosed herein is a method for recovering at least cobalt of valuable metals, cobalt and nickel, from an acidic solution obtained by subjecting waste containing positive electrode materials for lithium ion secondary batteries to a wet process, the acidic solution comprising cobalt ions, nickel ions and impurities, wherein the method comprises: a first extraction step for Co recovery, the first extraction step being for extracting cobalt ions by solvent extraction from the acidic solution and stripping the cobalt ions; an electrolytic step for Co recovery, the electrolytic step being for providing electrolytic cobalt by electrolysis using a stripped solution obtained in the first extraction step for Co recovery as an electrolytic solution; a dissolution step for Co recovery, the dissolution step being for dissolving the electrolytic cobalt in an acid; and a second extraction step for Co recovery, the second extraction step being for extracting cobalt ions by solvent extraction from a cobalt dissolved solution obtained in the dissolution step for Co recovery and stripping the cobalt ions.

Advantageous Effects of Invention

According to the above method for recovering a valuable metal, certain impurities can be effectively removed by including the dissolution step for Co recovery, which is for dissolving the electrolytic cobalt in the acid, and the second extraction step for Co recovery, which is for extracting the cobalt ions by solvent extraction from the cobalt dissolved solution obtained in the dissolution step for Co recovery and stripping the cobalt ions.

DETAILED DESCRIPTION OF THE INVENTION

Hereinafter, embodiments of the invention disclosed herein will be described in detail.

Figure 1:
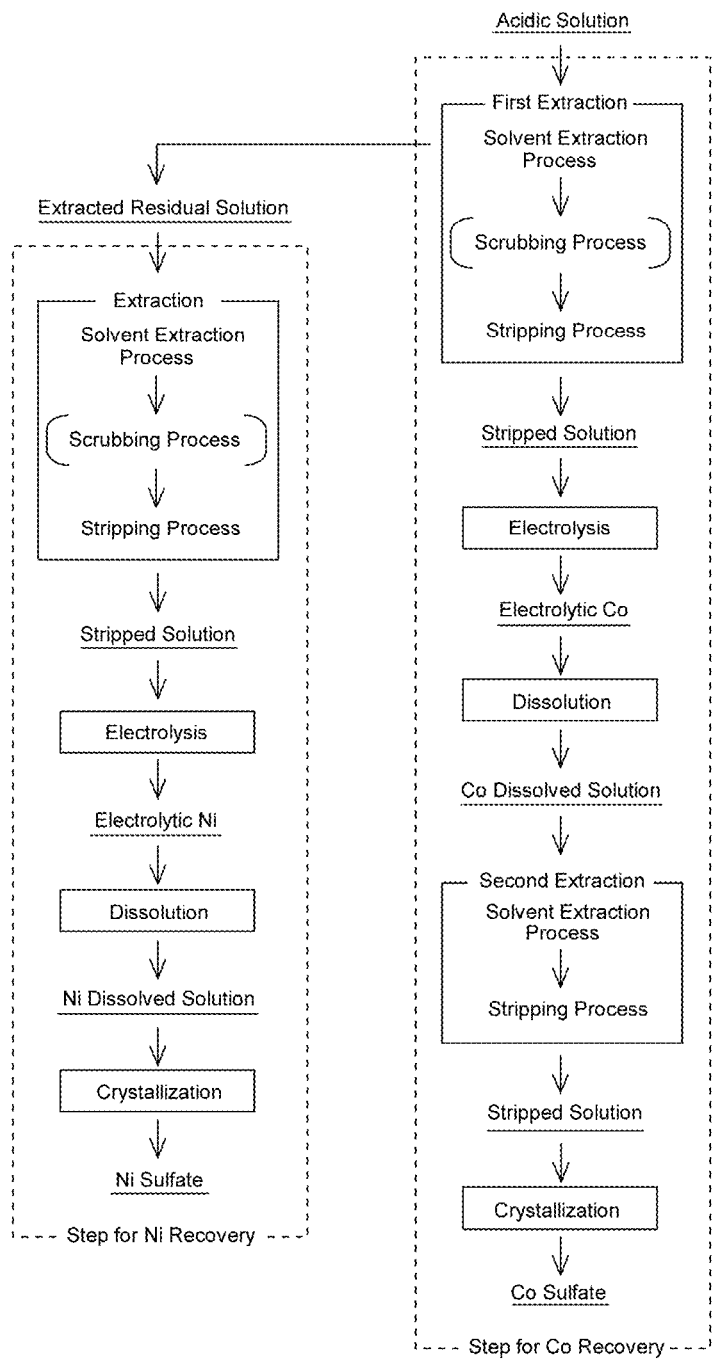
FIG. 1 is a flow chart showing a method for recovering a valuable metal according to an embodiment.

A method for recovering a valuable metal according to an embodiment includes carrying out each step as illustrated in FIG. 1 on an acidic solution which is obtained by subjecting waste containing positive electrode materials for lithium ion secondary batteries to a wet process, and which contains cobalt ions, nickel ions and impurities, and recovering at least cobalt of valuable metals, cobalt and nickel, from the acidic solution. More particularly, this embodiment includes: a first extraction step for Co recovery, the first extraction step being for extracting cobalt ions by solvent extraction and stripping the cobalt ions from the acidic solution; an electrolytic step for Co recovery, the electrolytic step being for providing electrolytic cobalt by electrolysis using a stripped solution obtained in the first extraction step for Co recovery as an electrolytic solution; a dissolution step for Co recovery, the dissolution step being for dissolving the electrolytic cobalt in an acid; and a second extraction step for Co recovery, the second extraction step being for extracting cobalt ions by solvent extraction from a cobalt dissolved solution obtained in the dissolution step for Co recovery and stripping the cobalt ions.

<Acidic Solution>

Figure 2:
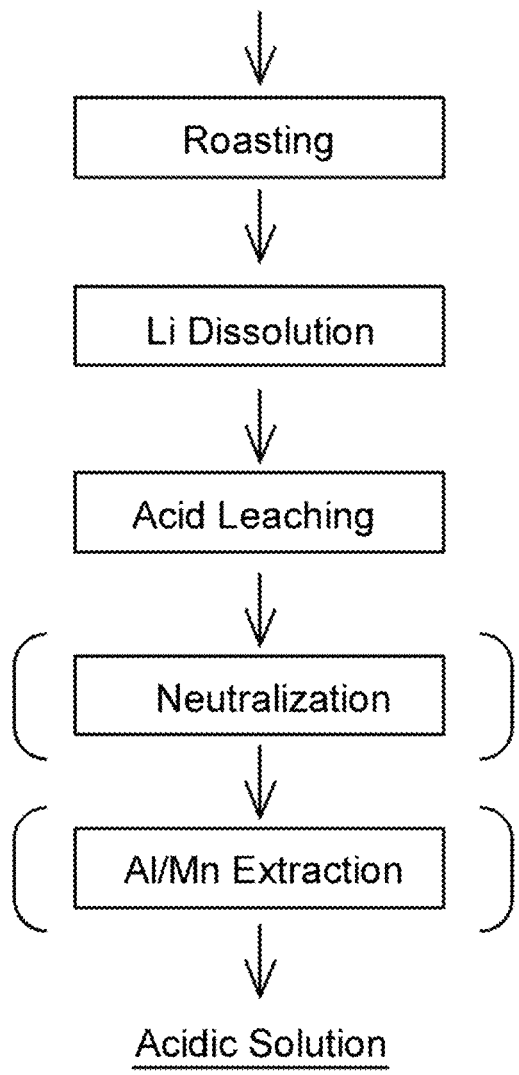
FIG. 2 is a flow chart showing an example of steps for obtaining an acidic solution of FIG. 1.

To obtain an acidic solution, for example, as shown in FIG. 2, a roasting step of roasting waste containing positive electrode materials for lithium ion secondary batteries can be carried out, followed by an optional sieving step, a lithium dissolution step of dissolving lithium using water or the like under a sieve, and an acid leaching step of leaching a residue of the lithium dissolution step with an acid. The resulting leached solution can be an acid leaching solution. In some cases, after the acid leaching step, only the neutralization step or only the Al/Mn extraction step or both the neutralization step and the Al/Mn extraction step can be carried out on the leached solution in this order, and the neutralized solution or the extracted solution can be used as the acidic solution. The respective steps will be described in detail below. It should be noted that the acidic solution is not limited to that described herein as long as it is obtained by subjecting the waste containing the positive electrode materials for lithium ion secondary batteries to any wet process.

(Waste Containing Positive Electrode Material for Lithium Ion Secondary Batteries)

The waste of interest, which contains positive electrode materials for lithium ion secondary batteries (hereinafter, referred to as simply "battery waste") includes positive electrode materials which have been discarded due to the expired life of the product, manufacturing defects or other reasons, for lithium ion secondary batteries which can be used in various electronic devices such as mobile phones. The recovery of valuable metals from such battery waste is preferred in terms of effective utilization of resources. Further, an object herein is to recover valuable metals cobalt and nickel with high purity so that they can be reused for manufacturing lithium ion secondary batteries.

Here, this embodiment targets battery waste containing at least cobalt and nickel. In particular, the battery waste typically contains 30% by mass or less of cobalt and 30% by mass or less of nickel. The battery waste may contain, for example, from 0.1% by mass to 40.0% by mass of cobalt and from 0.1% by mass to 15.0% by mass of nickel.

The lithium ion secondary battery has a housing containing aluminum as an exterior that wraps around the lithium ion secondary battery. Examples of the housing include those made only of aluminum and those containing aluminum, iron, aluminum laminate, and the like. The lithium ion secondary battery may also contain, in the above housing, positive electrode active materials composed of one single metal oxide or two or more composite metal oxides or the like, selected from the group consisting of lithium, nickel, cobalt and manganese, and aluminum foils (positive electrode substrates) to which the positive electrode active materials are applied and fixed by, for example, polyvinylidene fluoride (PVDF) or other organic binder. In addition, the lithium ion battery may contain copper, iron, or the like. Further, the lithium ion secondary battery generally contains an electrolytic solution in the housing. For example, ethylene carbonate, diethyl carbonate or the like may be used as the electrolytic solution.

The battery waste may be in the form of being wrapped by the housing, or may be in the form of powder that has already been subjected to any processing such as crushing, decomposition or separation. Such powdered battery waste may present black color. On the other hand, when the battery waste in the form of being wrapped by the housing is targeted, a crushing step for removing the positive electrode materials and negative electrode materials from the housing can be performed after the roasting step.

(Roasting Step)

In the roasting step, the above battery waste is heated. The roasting step is carried out for the purposes of changing a metal such as lithium and cobalt contained in the battery waste to a form of the metal which can be easily dissolved, and the like, for example.

In the roasting step, the battery waste is preferably heated by maintaining it in a temperature range of from 450° C. to 1000° C., preferably in a temperature range of from 600° C. to 800° C., for 0.5 to 4 hours, for example. The roasting step can be carried out by using various heating equipment such as a rotary kiln furnace or other various furnaces, and a furnace for heating in an air atmosphere.

(Lithium Dissolution Step)

In the lithium dissolution step, the battery waste that has undergone the roasting step is brought into contact with water to dissolve the lithium contained therein in water. This can allow lithium contained in the battery waste to be separated at an early phase of the recovery process. The water used herein can be tap water, industrial water, distilled water, purified water, ion-exchanged water, pure water, ultrapure water and the like.

(Acid Leaching Step)

In the acid leaching step, the residue obtained in the above lithium dissolution step is added to an acidic solution such as sulfuric acid and leached therein. The acid leaching step can be carried out by a known method or conditions. It is preferable that a pH of the acidic solution is from 0 to 2.0, and an oxidation-reduction potential (ORP value, silver/silver chloride potential reference) of the acidic solution is 0 mV or less.

(Neutralization Step)

A leached solution obtained in the acid leaching step can be subjected to a neutralization step of adding an alkali such as sodium hydroxide, sodium carbonate, and ammonia to the leached solution to increase a pH of the leached solution, whereby aluminum in the leached solution can be precipitated and removed. However, the neutralization step may be omitted.

In the neutralization step, the pH is preferably from 4.0 to 6.0, the ORP value (ORPvsAg/AgCl) is preferably from −500 mV to 100 mV, and the solution temperature is preferably from 50° C. to 90° C.

The neutralization step is generally carried out under a condition where a part of Al contained in the leached solution is removed, in order to suppress a loss of cobalt or nickel due to coprecipitation. Thus, the residue of the Al will remain in a dissolved state in the neutralized solution. The residue of Al can be removed in the next extraction step. An Al concentration after the neutralization step is generally from 0.1 g/L to 1.0 g/L, typically from 0.3 g/L to 0.8 g/L.

(Al/Mn Extraction Step)

After the acid leaching step or the neutralization step when the neutralization step is carried out, an Al/Mn extraction step is carried out to extract the residue of aluminum and manganese from the leached solution or the neutralized solution. In this case, the residue of aluminum and manganese are extracted to obtain an extracted residual solution (an aqueous phase) from which they have been removed. The Al/Mn extraction step may be omitted.

In the Al/Mn extraction step, it is preferable to use a mixed extracting agent containing a phosphate ester-based extracting agent and an oxime-based extracting agent for the leached solution or the neutralized solution. Here, examples of the phosphate ester-based extracting agent include di-2-ethylhexylphosphoric acid (trade name: D2EHPA or DP8R). The oxime-based extracting agent is preferably aldoxime or based on aldoxime. Specific examples include 2-hydroxy-5-nonylacetophenone oxime (trade name: LIX 84), 5-dodecylsalicylaldoxime (trade name: LIX 860), a mixture of LIX 84 and LIX 860 (trade name: LIX984), 5-nonylsalicylaldoxime (trade name: ACORGAM 5640) and the like, among which 5-nonylsalicylaldoxime is preferable in terms of price and the like.

In the solvent extraction, the pH is preferably from 2.3 to 3.5, and more preferably from 2.5 to 3.0.

The leached solution obtained in the acid leaching step, the neutralized solution obtained in the neutralization step or the extracted residual solution obtained in the Al/Mn extraction step as described above can be the acidic solution targeted in steps for Co recovery as described later.

Such an acidic solution may contain cobalt ions, for example in an amount of from 0 g/L to 15 g/L, typically from 5 g/L to 10 g/L, and nickel ions, for example in an amount of from 0 g/L to 50 g/L, typically from 5 g/L to 30 g/L.

Further, the acidic solution may contain at least one selected from the group consisting of sodium ions, aluminum ions, manganese ions, and lithium ions as impurities. Among them, the sodium ions are impurities that may be contaminated in various steps such as the neutralization step, so that it is important to effectively remove them in the steps as described later. When containing the sodium ions, the sodium concentration may be, for example, from 0.1 g/L to 30 g/L, typically from 10 g/L to 20 g/L. When containing the aluminum ions, the aluminum concentration may be, for example, from 0.000 g/L to 0.050 g/L, typically from 0.010 g/L to 0.020 g/L. When containing the manganese ions, the manganese concentration may be, for example, from 0.000 g/L to 0.100 g/L, typically from 0.010 g/L to 0.050 g/L. When containing the lithium ions, the lithium concentration may be, for example, from 0.000 g/L to 2 g/L, typically from 0.100 g/L to 1.5 g/L. In addition, the acidic solution may contain iron ions and/or copper ions. The iron concentration may preferably be 10 mg/L or less, more preferably 0.005 g/L or less, and the copper concentration may preferably be 10 mg/L or less, more preferably 0.005 g/L or less.

(Step for Co Recovery)
(First Extraction Step)

The first extraction step is carried out to recover cobalt or both of cobalt and nickel from the acidic solution as described above. This first extraction step is also referred to as a first extraction step for Co recovery, because it mainly extracts the cobalt ions in the acidic solution by solvent extraction and strip them.

More particularly, the first extraction step carries out a solvent extraction process for extracting the cobalt ions from the acidic solution into an extracting agent (an organic phase) as a solvent using a phosphonate ester-based extracting agent. As the phosphonate ester-based extracting agent, 2-ethylhexyl 2-ethylhexylphosphonate (trade name: PC-88A, lonquest 801) is preferable in terms of separation efficiency of nickel and cobalt. A pH at the time of extraction is preferably from 5.0 to 6.0, and more preferably from 5.2 to 5.7.

The extracting agent (an organic phase) containing the cobalt ions after the solvent extraction can be subjected to stripping. The solution used for the stripping may be any of inorganic acids such as sulfuric acid, hydrochloric acid and nitric acid, but sulfuric acid is generally preferable. Here, the stripping is carried out under such a pH condition that all of possible cobalt ions are extracted from the organic phase into the solution (aqueous phase). Specifically, the pH is preferably in a range of from 2 to 4, and even more preferably in a range of from 2.5 to 3.5. It should be noted that the O/A ratio and the number of stripping processes can be appropriately determined. The temperature of the solution may be room temperature, but it is preferably from 0° C. to 40° C.

The extracting agent that has extracted the cobalt ions may be scrubbed one or more times using a scrubbing solution to wash away the acidic solution that may be contained in the extracting agent before being subjected to the stripping. This can allow nickel ions, sodium ions, and the like that may be contained in the extracting agent can be removed from the extracting agent. The scrubbing solution can be, for example, a sulfuric acid acidic solution, and have a pH of from 3.5 to 5.5. Since the scrubbing solution after being used for scrubbing may contain cobalt ions, it may be mixed with the acidic solution intended to extract the cobalt ions in the first extraction step for Co recovery in order to reduce cobalt loss.

(Electrolysis Step)

The stripped solution obtained in the first extraction step for Co recovery as described above is used as an electrolytic solution in an electrolytic step for Co recovery. In this electrolytic step, the cobalt ions contained in the electrolytic solution are deposited onto an electrode by electrolysis using the electrolytic solution to obtain electrolytic cobalt.

In the electrolysis step, particularly sodium, aluminum, manganese, and the like can be effectively removed. Therefore, the above acidic solution may contain sodium ions, aluminum ions, and manganese ions, and the neutralization step and/or the Al/Mn extraction step as described above may be omitted.

The electrolysis step can be carried out under known conditions. For example, it can be carried out at a solution temperature adjusted to 40° C. to 60° C., a pH adjusted to 1.5 to 2.0, and a current density of from 190 A/m$^2$ to 210 A/m$^2$.

(Dissolution Step)

In the dissolution step for Co recovery, the electrolytic cobalt obtained in the electrolysis step is dissolved in sulfuric acid or acids such as sulfuric acid and an oxidizing agent to obtain a cobalt dissolved solution. In this case, if nickel is contained in the electrolytic cobalt, nickel is also dissolved to obtain a cobalt solution containing cobalt ions and nickel ions.

A pH of the sulfuric acid acidic solution during dissolution can be, for example, from 1 to 5, and preferably from 2 to 4. If the pH is too high, the leaching of cobalt may be slow, and if the pH is too low, an amount of a pH adjusting agent added to the subsequent second extraction step may be increased.

The cobalt concentration in the cobalt solution obtained herein can be, for example, from 10 g/L to 150 g/L, preferably from 100 g/L to 130 g/L. The cobalt solution has a sufficiently reduced impurity concentration, such as, for example, a sodium concentration of 5 mg/L or less, more preferably 1 mg/L or less, and the total concentration of aluminum and manganese of 1 mg/L or less, more preferably 0.5 mg/L or less. The total concentration of aluminum and manganese is a value calculated as a concentration of zero if one or both of aluminum and manganese are not contained.

(Second Extraction Step)

In order to selectively extract the cobalt ions from the cobalt solution obtained in the dissolution step to separate the cobalt ions from the nickel ions, a second extraction step (second extraction step for Co recovery) by solvent extraction is performed. In the steps for Co recovery, the nickel ions can be treated as impurities.

Here, in order to selectively extract the cobalt ions, it is preferable to use a masking agent for masking the nickel ions and leaving them in the aqueous phase at the time of extraction. As the masking agent, ammonia ions are particularly effective because they do not mask the cobalt ions but mask the nickel ions. The ammonia ions also function as a pH adjusting agent during extraction.

Specifically, before or after bringing the cobalt solution into contact with the extracting agent, the ammonia ions can be added to the cobalt solution to adjust the pH to extract the cobalt ions. The ammonia ions can be added in the form of, for example, aqueous ammonia or ammonium chloride ($NH_4Cl$). When the aqueous ammonia is added, an amount of aqueous ammonia added is preferably from 1% to 10% in volume ratio with respect to the cobalt solution.

The extracting agent to be brought into contact with the cobalt dissolved solution may be a phosphonic acid-based extracting agent or a phosphoric acid-based extracting agent, but it is preferably a phosphinic acid-based extracting agent, and among them, it further preferably contains bis(2,4,4-trimethylpentyl)phosphinic acid. More particularly, ALBRITECT TH1 (trade name) or Cyanex 272 from SOLVAY are particularly preferable, although the present invention is not limited thereto. This can lead to an extraction curve of cobalt and nickel, which sufficiently separates them between a lower pH side and a higher pH side as compared with the extracting agent such as 2-ethylhexyl 2-ethylhexylphosphonate (PC-88A, lonquest 801), whereby a range where the cobalt ions are extracted but the nickel ions are not extracted will be expanded. That is, this can achieve an easier selective extraction of only cobalt ions. When the extracting agent contains bis(2,4,4-trimethylpentyl)phosphinic acid, its purity can be, for example, 95% or higher.

The extracting agent can employ a hydrocarbon-based organic solvent such as an aromatic-based, paraffin-based, or naphthenic-based solvent, which can be diluted to have a concentration of from 10 to 30% by volume.

As an example of the extraction procedure, the cobalt solution (aqueous phase) and the above extracting agent (organic phase) are brought into contact with each other while adding aqueous ammonia or the like, and they are mixed with a mixer with stirring, for example, at 200 to 500 rpm for 5 to 60 minutes to allow the cobalt ions to react with the extracting agent. The solution temperature at this time is from 15° C. to 60° C. The combined organic phase and aqueous phase are then separated by a difference in specific gravity.

The solvent extraction may be repeated, and use, for example, a multi-stage method in which the organic phase and the aqueous phase are in countercurrent contact with each other. The O/A ratio (volume ratio of the organic phase to the aqueous phase) is generally from 0.1 to 10.

An equilibrium pH during extraction is preferably from 4 to 7, and more preferably from 5 to 6. This can allow the nickel ions to be left in the aqueous phase and cobalt ions to be effectively extracted into the organic phase. However, the appropriate pH range may be outside the above range, because it may change depending on combinations of the cobalt concentration, the volume fraction of the extracting agent, the phase ratio of oil and water, the temperature, and the like.

After the extraction, stripping is performed on the organic phase containing the cobalt ions. The stripping can be carried out by using a stripping solution such as an acidic aqueous solution of sulfuric acid or hydrochloric acid and mixing them with a mixer or the like with stirring at 200 to 500 rpm for 5 to 60 minutes.

As the stripping solution, sulfuric acid is preferably used in view of the next step, i.e., a crystallization step of cobalt sulfate. An acid concentration of the stripping solution is preferably adjusted to a pH of from 1.0 to 3.0, and more preferably a pH of from 1.5 to 2.5.

The stripping can be carried out at 15° C. to 60° C. or lower.

The stripping can allow the cobalt ions to move from the organic phase to the aqueous phase side to obtain a stripped solution (aqueous phase) containing cobalt ions. Here, since a large amount of nickel ions have left in the aqueous phase during extraction as described above, the stripped solution contains substantially no nickel ions.

The cobalt concentration in the stripped solution is, for example, from 1 g/L to 200 g/L, typically from 80 g/L to 100 g/L. The nickel concentration in the stripped solution can be, for example, 2 mg/L or less, typically 1 mg/L or less.

(Crystallization Step)

The stripped solution obtained in the extraction step is subjected to a crystallization step for Co recovery, which crystallizes the cobalt ions contained therein. Here, the stripped solution is heated to, for example, 40° C. to 120° C. to concentrate them, and the cobalt ions are crystallized as cobalt sulfate.

Impurities other than cobalt ions have been sufficiently removed from the stripped solution through the above steps. Therefore, in this embodiment, it is possible to omit a washing step for removing the impurities after the second extraction step and before the crystallization step. Therefore, in this embodiment, the crystallization step can be performed on the stripped solution obtained in the second extraction step without undergoing the washing step.

The cobalt sulfate thus produced has a nickel content of preferably 5 ppm by mass or less, and nickel is sufficiently removed, so that the cobalt sulfate can be effectively used as a raw material for the production of lithium ion secondary batteries and other batteries.

(Step for Ni Recovery)
(Extraction Step)

In the step for Co recovery, the nickel ions are separated from the extracted residual solution obtained in the first extraction step for Co Recovery as described above using a carboxylic acid-based extracting agent. Examples of the carboxylic acid-based extracting agent include neodecanoic acid and naphthenic acid. Among them, neodecanoic acid is preferable in terms of an extraction ability of the nickel ions.

In the solvent extraction in the Ni recovery step, the pH is preferably from 6.0 to 8.0, and more preferably from 6.8 to 7.2.

After the extraction, the organic phase containing the nickel ions is stripped using a stripping solution such as sulfuric acid, hydrochloric acid or nitric acid. For general purposes, sulfuric acid is desirable. Here, the stripping is carried out under such a pH condition that 100% of Ni is extracted from the organic phase into an acidic solution (aqueous phase). Specifically, the pH is preferably in the range of from 1.0 to 3.0, and more preferably from 1.5 to 2.5. The O/A ratio and the number of stripping processes can be appropriately determined, but the O/A ratio is preferably from 5 to 1, and more preferably from 4 to 2. By increasing the number of stripping processes, the concentration of the target metal can be increased to a concentration that is advantageous for the electrolysis step.

(Electrolysis Step)

In the electrolytic step for Ni recovery, the stripped solution obtained in the extraction step for Ni recovery is used as an electrolytic solution, and the nickel ions contained in the electrolytic solution are deposited onto an electrode by electrolysis to obtain electrolytic nickel.

The electrolysis step can be carried out under known conditions. For example, it can be carried out at a solution temperature adjusted to 40° C. to 60° C., a pH adjusted to 1.5 to 2.0, and a current density of from 190 A/m$^2$ to 210 A/m$^2$.

(Dissolution Step)

The dissolution step for Ni recovery is carried out by dissolving the electrolytic nickel obtained in the dissolution step for Ni recovery in sulfuric acid or acids such as sulfuric acid and an oxidizing agent to obtain a nickel solution. The pH at the end of this dissolution can be, for example, from 1 to 5, preferably from 2 to 4.

The nickel concentration in the nickel solution is, for example, from 10 g/L to 150 g/L, and preferably 100 g/L to 130 g/L.

The sodium concentration in the nickel solution is preferably 5 mg/L or less, and more preferably 1 mg/L or less, and the total concentration of aluminum and manganese is 1 mg/L or less, and more preferably 0.5 mg/L or less. By undergoing each of the steps as described above, the impurity concentration in the nickel solution can be sufficiently reduced in this manner.

(Crystallization Step)

In the crystallization step for Ni recovery, the above nickel solution is heated to, for example, 40° C. to 120° C. to concentrate it, and the nickel ions are crystallized as nickel sulfate.

The cobalt sulfate obtained in the crystallization step contains substantially no impurities and is suitable for use as a raw material for manufacturing lithium ion secondary batteries.

EXAMPLES

The method as described above was experimentally conducted and its effects were confirmed as described below. However, the description herein is merely for the purpose of illustration and is not intended to be limited thereto.

Figure 3:
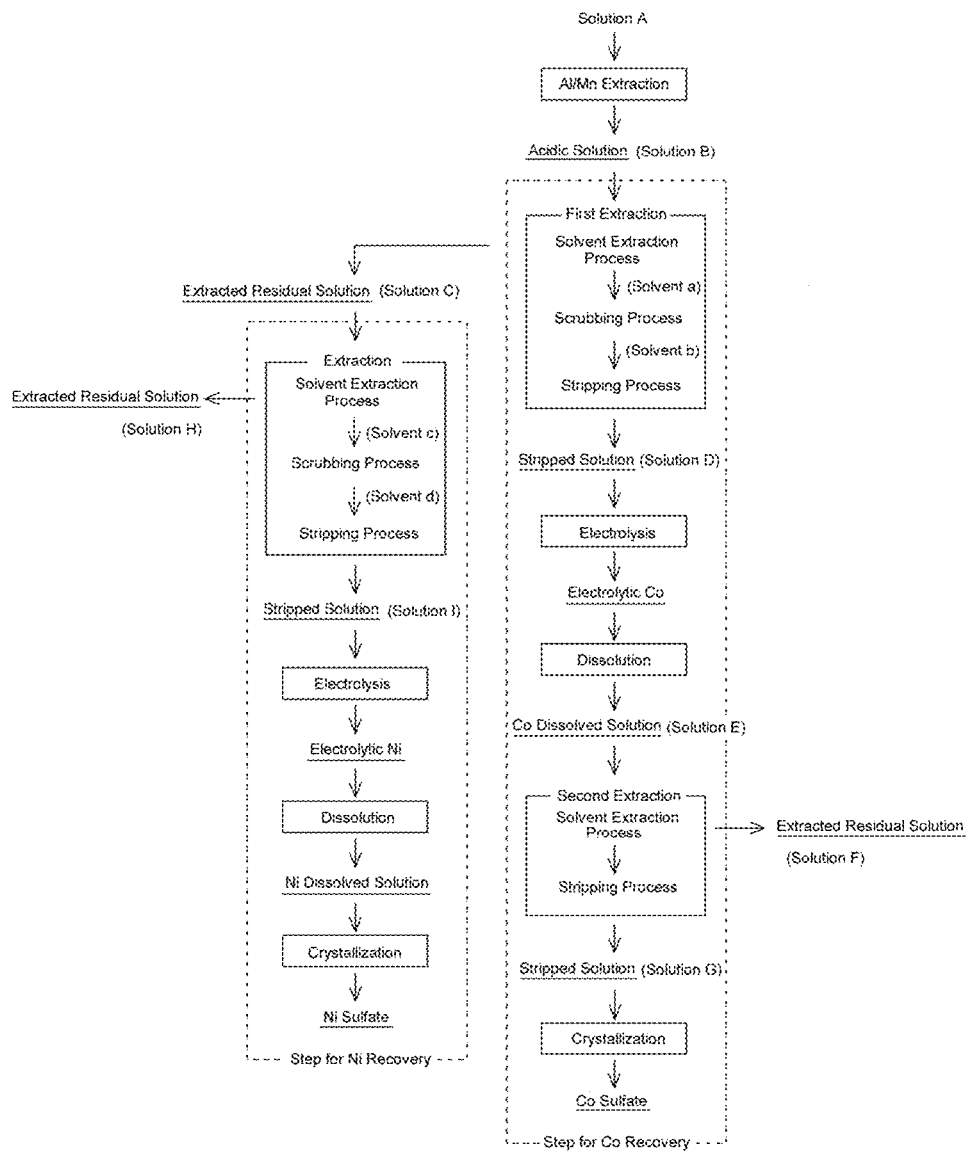
FIG. 3 is a flow chart showing a method according to Example.

The acidic solution was subjected to each step shown in FIG. 3 to obtain cobalt sulfate and nickel sulfate. Details are as follows:

(Acidic Solution)

As described above, black powdery waste containing positive electrode materials for lithium ion secondary batteries was subjected to the steps of roasting, lithium dissolution, acid leaching, neutralization, and Al/Mn extraction in this order to obtain an acidic solution containing cobalt ions and nickel ions (Solution B). Table 1 shows concentrations of various metals in the solution before and after the extraction of Al and Mn by which the acidic solution (Solution B) was obtained. In Table 1, Solution A is a solution before the Al/Mn extraction step is performed.

TABLE 1

|  | Co | Ni | Al | Fe | Cu | Li | Mn | Na |
|---|---|---|---|---|---|---|---|---|
| Before (Solution A) [mg/L] | 15,000 | 43,000 | 103 | 52 | <10 | 1,500 | 15,000 | 8,500 |
| After (Solution B) [mg/L] | 11,000 | 35,000 | 14 | <10 | <10 | 1,000 | 0.28 | 24,000 |

(Step for Co Recovery)

The above acidic solution (Solution B) was subjected to the first extraction step. For the extraction conditions in the first extraction step, 2-ethylhexyl 2-ethylhexylphosphonate (trade name: PC-88A) was used, and the pH during extraction was 5.5. As a result, an extracting agent (Solvent a) that extracted cobalt ions was obtained. The concentrations of various metals in the extracted residual solution (Solution C) were as shown in Table 2.

TABLE 2

|  | Co | Ni | Al | Fe | Cu | Li | Mn | Na |
|---|---|---|---|---|---|---|---|---|
| Before (Solution B) [mg/L] | 11,000 | 35,000 | 14 | <10 | <10 | 1,000 | 0.25 | 24,000 |
| After (Solution C) [mg/L] | 0.01 | 30,000 | <1 | <1 | <1 | 770 | <1 | 35,000 |

The extracting agent (Solvent a) that extracted the cobalt ions was then scrubbed with a scrubbing solution to obtain Solvent b in which nickel ions and the like were reduced as shown in Table 3, and then stripped to obtain a stripped solution (Solution D) having the concentrations as shown in Table 4. The scrubbing was performed under the condition of pH 4.5, and the stripping was performed under the condition of pH 2.0.

TABLE 3

|  | Co | Ni | Al | Fe | Cu | Li | Mn | Na | Vol [L] |
|---|---|---|---|---|---|---|---|---|---|
| Before (Solvent a) [mg/L] | 10,000 | 5,000 | <1 | <1 | <1 | 50 | 0.25 | 500 | 60 |
| After (Solvent b) [mg/L] | 10,000 | 44 | <1 | <1 | <1 | <1 | 0.25 | 1 | 60 |

TABLE 4

|  | Co | Ni | Al | Fe | Cu | Li | Mn | Na | Vol [L] |
|---|---|---|---|---|---|---|---|---|---|
| After (Solution D) [mg/L] | 125,000 | 625 | <1 | <1 | <1 | <1 | 3 | 9 | 6.45 |

The electrolysis step was performed using the above stripped solution (Solution D) as an electrolytic solution, and the resulting electrolytic cobalt was dissolved in sulfuric acid, and the resulting cobalt solution (Solution E) was then subjected to the second extraction step. For the extraction conditions of the second extraction step, bis(2,4,4-trimethylpentyl)phosphinic acid was used and the pH was 5.5, and for the stripping conditions, the pH was 2.0. Tables 5 and 6 show metal concentrations before and after the extraction in the second extraction step and metal concentrations after the stripping, respectively. It should be noted that Solution F in Table 5 is the extracted residual solution in the second extraction step.

TABLE 5

|  | Co | Ni | Al | Fe | Cu | Li | Mn | Na | Vol [L] |
|---|---|---|---|---|---|---|---|---|---|
| Before (SolutionE)[mg/L] | 20,000 | 100 | <1 | 12 | <1 | <1 | 1 | 100 | 4.65 |
| After (SolutionF)[mg/L] | 200 | 100 | <1 | <1 | <1 | <1 | 0 | 100 | 4.65 |

TABLE 6

|  | Co | Ni | Al | Fe | Cu | Li | Mn | Na | Vol [L] |
|---|---|---|---|---|---|---|---|---|---|
| After (SolutionG)[mg/L] | 120,000 | 3 | <1 | <1 | <1 | <1 | 3 | 4 | 0.86 |

The stripped solution (Solution G) in the second extraction step was subjected to the crystallization step under the condition of 80° C. to obtain cobalt sulfate. A metal quality of cobalt sulfate was as shown in Table 7. As can be seen from the results shown in Table 7, the cobalt sulfate had sufficiently reduced impurities such as nickel and sodium, and had high cobalt purity.

TABLE 7

|  | Co | Ni | Al | Fe | Cu | Li | Mn | Na |
|---|---|---|---|---|---|---|---|---|
| Co Sulfate [ppm] | 20.4% | <1 | <1 | <1 | <1 | <1 | <1 | <1 |

(Step for Ni Recovery)

Using the extracted residual solution (Solution C) obtained in the first extraction step in the step for Co recovery, the extraction step was carried out by extracting, scrubbing and then stripping the nickel ions. Table 8 shows metal concentrations before and after the extraction in the extraction step. Table 9 shows metal concentrations in Solvents c and d before and after the scrubbing. The extraction condition at this time was a pH of 7 using neodecanoic acid, and the stripping condition was a pH of 2. As a result, the stripped solution (Solution I) having the metal concentrations as shown in Table 10 was obtained.

TABLE 8

|  | Co | Ni | Al | Fe | Cu | Li | Mn | Na | Vol [L] |
|---|---|---|---|---|---|---|---|---|---|
| Before (Solution C) [mg/L] | <1 | 30,000 | <1 | <1 | <1 | 770 | <1 | 35,000 | 60 |
| After (SolutionH) [mg/L] | <1 | 1,500 | <1 | <1 | <1 | 770 | <1 | 39,000 | 60 |

TABLE 9

|  | Co | Ni | Al | Fe | Cu | Li | Mn | Na | Vol [L] |
|---|---|---|---|---|---|---|---|---|---|
| Before (Solvent c)[mg/L] | <1 | 28,500 | <1 | <1 | <1 | <1 | <1 | 500 | 60 |
| After (Solvent d) [mg/L] | <1 | 28,500 | <1 | <1 | <1 | <1 | <1 | 1 | 60 |

TABLE 10

|  | Co | Ni | Al | Fe | Cu | Li | Mn | Na | Vol [L] |
|---|---|---|---|---|---|---|---|---|---|
| After (Solution I) [mg/L] | 0 | 117,000 | <1 | <1 | <1 | 6 | 3 | 5 | 12.2 |

The electrolyte step was carried out using the stripped solution (Solution I) in the above extraction step as an electrolytic solution, and the dissolution step of dissolving the resulting electrolytic nickel in sulfuric acid was carried out.

Subsequently, the crystallization step of concentrating the nickel solution obtained in the dissolution step was carried out under the condition of 80° C. to obtain nickel sulfate. The components of the nickel sulfate are shown in Table 11. As can be seen from Table 11, the nickel sulfate obtained herein had few impurities and had sufficiently high purity of nickel.

TABLE 11

|  | Co | Ni | Al | Fe | Cu | Li | Mn | Na |
|---|---|---|---|---|---|---|---|---|
| Ni Sulfate [ppm] | <1 | 21.9% | <1 | <1 | <1 | <1 | <1 | <1 |

The invention claimed is:

1. A method for recovering a valuable metal, the method recovering at least cobalt of valuable metals, cobalt and nickel, from an acidic solution obtained by subjecting waste containing positive electrode materials for lithium ion secondary batteries to a wet process, the acidic solution comprising cobalt ions, nickel ions and impurities, wherein the method comprises:
 a first extraction step for Co recovery, the first extraction step being for extracting cobalt ions by solvent extraction from the acidic solution and stripping the cobalt ions;
 an electrolytic step for Co recovery, the electrolytic step being for providing electrolytic cobalt by electrolysis using a stripped solution obtained in the first extraction step for Co recovery as an electrolytic solution;
 a dissolution step for Co recovery, the dissolution step being for dissolving the electrolytic cobalt in an acid; and
 a second extraction step for Co recovery, the second extraction step being for extracting cobalt ions by solvent extraction from a cobalt dissolved solution obtained in the dissolution step for Co recovery and stripping the cobalt ions.

2. The method for recovering a valuable metal according to claim 1,
wherein the impurities contained in the acidic solution comprises sodium ions, and
wherein a cobalt dissolved solution obtained in the dissolution step for Co recovery has a sodium concentration of 5 mg/L or less.

3. The method for recovering a valuable metal according to claim 1,
wherein the impurities contained in the acidic solution comprise aluminum and/or manganese, and
wherein a total concentration of aluminum and manganese in the cobalt dissolved solution obtained in the dissolution step for Co recovery is 1 mg/L or less.

4. The method for recovering a valuable metal according to claim 1, further comprising:
an extraction step for Ni recovery, the extracting step being for extracting nickel ions by solvent extraction from an extracted residual solution obtained in the first extraction step for Co recovery and stripping the nickel ions;
an electrolysis step for Ni recovery, the electrolysis step being for performing electrolysis using a stripped solution obtained in the extraction step for Ni recovery as an electrolytic solution; and
a dissolution step for Ni recovery, the dissolution step being for dissolving electrolytic nickel obtained in the electrolysis step for Ni recovery.

5. The method for recovering a valuable metal according to claim 4, further comprising a crystallization step for Ni recovery, the crystallization step being for using a nickel dissolved solution obtained in the dissolution step for Ni recovery to crystallize nickel ions contained in the nickel dissolved solution.

6. The method for recovering a valuable metal according to claim 4,
wherein the impurities contained in the acidic solution comprises sodium ions, and
wherein a nickel dissolved solution obtained in the dissolution step for Ni recovery has a sodium concentration of 5 mg/L or less.

7. The method for recovering a valuable metal according to claim 4,
wherein the impurities contained in the acidic solution comprise aluminum and/or manganese, and
wherein a total concentration of aluminum and manganese in the nickel dissolved solution obtained in the dissolution step for Ni recovery is 1 mg/L or less.

8. The method for recovering a valuable metal according to claim 1, wherein the acidic solution comprises from 0.1 g/L to 30 g/L of sodium ions.

* * * * *